F. L. Bailey,
Clod Fender.

No. 112,405. Patented Mar. 7, 1871.

Witnesses:
Geo. F. Ward.
O. F. Mayhew.

Fortune L. Bailey, Inventor

UNITED STATES PATENT OFFICE.

FORTUNE L. BAILEY, OF FREEPORT, INDIANA.

IMPROVEMENT IN CLOD-FENDERS.

Specification forming part of Letters Patent No. 112,405, dated March 7, 1871.

*To all whom it may concern:*

Be it known that I, FORTUNE L. BAILEY, of Freeport, in the county of Shelby and State of Indiana, have invented a new and Improved Mode of Making Clod-Fenders to keep the clods off the corn while plowing; and I do hereby declare that the following is a full and exact description thereof, reference being had to the accompanying drawings, and to the letters of reference marked thereon.

The nature of my invention consists in providing the ordinary corn-plow with a simple device for keeping the clods off the corn while plowing, and which is easily detached when not needed.

To enable others skilled in the art to make and use my invention, I will proceed to describe its construction and operation.

Figure 1:
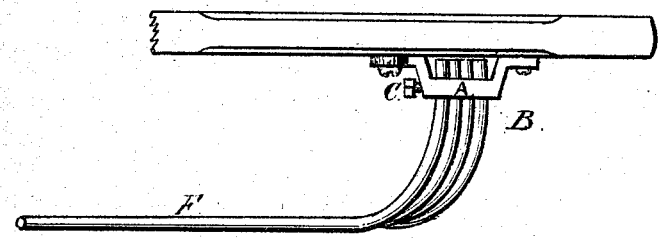
Figure 1:
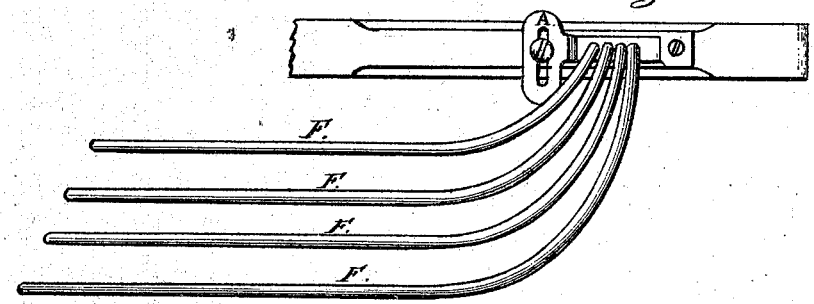
Figure 2:
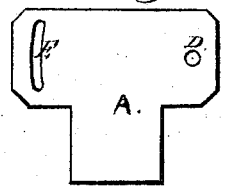
Figure 3:
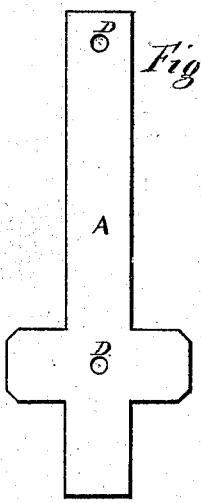
Figure 4:
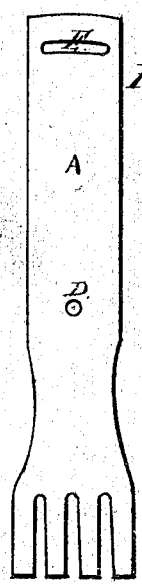

I construct a metallic head-block, A, as shown in Figures 1 and 2, with a mortise or cavities about the center, as shown at B, of any size to suit the rods to be used. At one end of the block A there is a round hole, as shown at D. At the other end of the block A there is a slot, as shown at E. These two holes are for the purpose of securing the fender to the side of the plow-beam, the slot E allowing the fender to play freely up and down, forming a pivot at D in Fig. 4. The rods F F F F are then placed into the mortise B, and by the set-screw C or by wedge the rods are securely fastened. The ends of the rods that pass through the head-block A may be welded together, if desired. When the head-block A is made, as shown in Fig. 2, with as many cavities or holes as there are rods desired, then by taking a rod of sufficient length and bending, as shown in Fig. 3, near the center, forming two parallel rods, then the rods are driven through the cavities in the head-block A and secured by rivet, as shown at H, or its equivalent. When the rods are secured in the head-block A, they are then bent down to the desired height, and then they are bent back to the rear, with any desired distance between the rods, and may also be adjusted to let as much fine dirt to the corn as is wished.

For the common double-shovel plow and a four-rod fender the rods may be made of about three-eighths rod-iron, and should be about twenty-six, twenty-eight, thirty, and thirty-two inches long, with the longest rod at the bottom and the others in rotation, according to length. They may either vary in length, size of iron, or number of rods, if desired.

What I claim as my invention, and desire to secure by Letters Patent, is—

The construction of the head-block A with mortise or cavities into which the rods or slats are put and made secure by set-screw, wedge, or rivet, that they may be moved or taken out at will, in combination with the rods, and for the purpose set forth, or its equivalent.

FORTUNE L. BAILEY.

Witnesses:
JOHN KITCHEL,
JOHN M. DAVIS.